United States Patent Office

2,786,832
Patented Mar. 26, 1957

2,786,832
PREPARATION OF FLAVONOID GLUCOSIDES

Simon H. Wender, Norman, Okla., and Daniel W. Fox, Schenectady, N. Y., assignors to the United States of America as represented by the United States Atomic Energy Commission No Drawing. Application October 6, 1953,
Serial No. 384,531
6 Claims. (Cl. 260—210)

Our invention relates to a method for the preparation of flavonoid compounds and more particularly to the preparation of flavonoid glucosides from their corresponding flavonoid rhamnoglucosides.

The flavonoid compounds comprise an important class of plant pigments which are widely distributed in the vegetable kingdom. Interest is shown in a number of these compounds due to their vitamin-like action in increasing the resistance of blood capillaries to rupture. For example, rutin enjoys widespread use as a drug for blood vessel treatment. The term "vitamin P" is sometimes applied to flavonoids having this property.

The rhamnoglucosides rutin, hesperidin and naringin are among the most readily available flavonoid compounds at present, whereas their corresponding glucosides, quercetin-3-glucoside (isoquercitrin), hesperetin-7-glucoside, and naringenin-7-glucoside (prunin) have been relatively difficult to obtain either as naturally occurring compounds or from the aforementioned rhamnoglucosides.

Basically, the structure of a flavonoid rhamnoglucoside involves the attachment of a biose consisting of glucose bonded to rhamnose to a flavonol while the corresponding glucoside involves merely the attachment of glucose to a flavonol. However, all previous attempts to remove solely the rhamnose portion of a biose attached to a flavonol resulted in the removal of the entire biose. Hydrolysis procedures employing acids such as sulfuric, acetic, phosphoric and citric were tried without success.

An object of our invention, therefore, is to provide an improved method for preparing flavonoid glucosides.

Another object is to provide a method for preparing flavonoid glucosides from their corresponding flavonoid rhamnoglucosides.

Further objects and advantages of our invention will be apparent from the following description.

In accordance with our invention, a flavonoid glucoside may be prepared from the corresponding flavonoid rhamnoglucoside by contacting said rhamnoglucoside with formic acid in an organic solvent and recovering the flavonoid glucoside from the resulting reaction mixture.

Employing our method, difficulty available glucosides may be easily prepared from readily available materials by the wholly unexpected action of formic acid in selectively hydrolyzing flavonoid rhamnoglucosides so that only the rhamnose portion of the molecule is removed rather than the entire biose.

Any flavonoid rhamnoglucoside may be treated, in accordance with our invention, to prepare the corresponding flavonoid glucoside. However, particularly satisfactory results may be obtained with rutin, a flavonol, hesperidin, a flavonone, and naringin, a flavanone.

Numerous substantially neutral organic solvents are suitable for use with our invention while, in general, alcohols and particularly aliphatic alcohols, are especially satisfactory due to the relatively good solubility of flavonoid compounds therein. However, since cyclohexanol appears to be unexpectedly outstanding for our purposes, our invention will be further illustrated specifically with respect to this particular alcohol.

Generally, only sufficient cyclohexanol to dissolve the flavonoid rhamnoglucoside is necessary. Suitable quantities of formic acid are from approximately ¼ to approximately ¾ of the volume of the cyclohexanol employed while approximately ½ of the volume of cyclohexanol is preferred.

Although the temperature employed is not critical, eminently satisfactory results may be achieved by employing reflux conditions. The exact refluxing temperature will, of course, depend upon the ratio of the formic acid to the cyclohexanol. However, the herein disclosed preferred mixtures will satisfactorily reflux at a temperature of approximately 100° C.–110° C.

The length of the reaction period is not critical. We find, however, that the reaction is relatively slow and that a period of approximately 10–30 hours is required in order to obtain optimum yields, while about 20 hours is preferred.

The flavonoid glucosides prepared in accordance with my invention may be recovered from the resulting reaction mixture in substantially pure form by the method disclosed in co-pending application S. N. 323,505, "Improved Method for the Separation of Flavonoid Compounds," filed December 1, 1952, by Simon H. Wender and Clark H. Ice, now Patent No. 2,738,346. The latter method comprises passing an organic solution of flavonoid compounds through a bed of a comminuted hydrous magnesium silicate absorbent, chromatographically eluting the resulting absorbed compounds from said bed with an aqueous-organic solvent and separately collecting the resulting individual flavonoid compounds.

In a preferred embodiment of our invention one part by volume of boiling cyclohexanol is saturated with a flavonoid rhamnoglucoside, ½ part by volume of formic acid is then added, and the resulting mixture refluxed for approximately 20 hours. The flavonoid glucoside product is recovered from the resulting refluxed mixture by the method of Wender and Ice referred to above.

The following specific examples illustrate our invention in greater detail.

*Example I*

Ten grams of rutin were dissolved in 225 ml. of boiling cyclohexanol. Seventy-five ml. of formic acid (85–90%) are next added through the reflux condenser, the addition being performed as rapidly as possible without flooding. The mixture was then refluxed, with stirring, for approximately 10 hours at a temperature of 102° C.–107° C. Small samples were withdrawn at regular intervals and chromatographed on paper, using 15% acetic acid-water as the solvent system. One could thus follow the progress of the hydrolysis and estimate the relative amounts of isoquercitrin, quercetin, and unhydrolyzed rutin present ($R_f$ values in the 15% acetic acid are 0.45, 0.09, and 0.62, respectively).

After about 10 hours of hydrolysis, distillation of the solvent was carried out in vacuo until practically no liquid came over. The volume of the mixture was made up to 600 ml. with anhydrous acetone and filtered through a 2.5 x 3 cm. column of "Magnesol" (a hydrous magnesium silicate adsorbent sold by the Food Machinery and Chemical Corporation, Westvaco Chemical Division, New York). The filtrate was then put on a 7 x 26 cm. column of Magnesol packed as an acetone slurry. When all of the flavonoids had been adsorbed, the top half of the column was colored. Several hundred ml. of anhydrous ethyl acetate were then passed through the column to displace the acetone and cyclohexanol. The column was next developed as a liquid chromatogram with wet ethyl acetate. A definite break occurred between the bulk of the quercetin and the glucosides, but sufficient quercetin still remained on the column to make detection of the glucoside zones almost impossible. The eluant was, therefore, collected in 200 ml. fractions. Small portions of each fraction were spotted on paper strips for chromatographic study. At the first appearance of isoquercitrin, the eluted fraction was saved and combined with all following fractions which showed isoquercitrin to be present. The combined solution of all the eluted fractions containing isoquercitrin was concentrated to 750 ml. by distillation and then rechromatographed on a fresh 3.5 x 20 cm. column of "Magnesol" packed as an anhydrous ethyl acetate slurry, and the column developed with an ethyl acetate-water solution. Four zones were detected on this column in both visible and ultraviolet light as elution proceeded. When the major portion of zone one, containing the quercetin, reached the bottom of the column, a faint zone, containing an unknown glycoside, was noted between this fastest moving pigment (quercetin) and the isoquercitrin which occupied the center portion of the column. Some unhydrolyzed rutin remained at the top of this column, but most of the rutin had been left on the preceding column. The major part of the center zone, containing the isoquercitrin, was eluted and the solvent removed in vacuo. Yellow solid isoquercitrin-yield approximately 760 mg. was obtained.

For final purification, the isoquercitrin was recrystallized at least four times from boiling alcohol-water. The supernatant liquid was removed by decantation after centrifugation. A trace of an oily material could not be removed when regular filtration was used instead. The recrystallized isoquercitrin was dried at 110° for one hour.

*Example II*

Five grams of hesperidin was dissolved in 250 ml. boiling cyclohexanol (minimum solvent requirement) and 125 ml. of formic acid (85–90%) was added as rapidly as possible through the reflux condenser. The hydrolysis mixture was refluxed approximately 20 hours and then distilled until the temperature reached 135°. Samples were withdrawn at 3–4 hour intervals, and chromatographed on paper, using 15% acetic acid-water as the solvent system. $R_f$ values in this system were 0.80 for hesperidin; 0.70 for hesperetin-7-glucoside; and 0.43 for hesperetin. From the paper chromatograms, no apparent improvement of yield resulted after about 15 hours, but the amount of aglycone increased, and the amount of hesperidin decreased.

The entire hydrolysis mixture was filtered through a 2.5 x 5 cm. column of "Magnesol" to remove decomposition material. On washing this column with dry acetone, the very dark material which had been adsorbed was removed. Only the initial filtrate was saved. A rough separation was effected on a 7.5 x 25 cm. column of Magnesol. The cyclohexanol solution was put on an acetone-"Magnesol" column; washed with dry ethyl acetate to displace the cyclohexanol; and finally developed as a liquid chromatogram with wet ethyl acetate. The entire column was white in ultraviolet light, but a slight break was detectable between the hesperetin and the hesperetin-7-glucoside after considerable elution. The hesperidin moved very slowly and remained near the top of the column. The 7-glucoside fraction was concentrated by distillation to 300 ml., and rechromatographed on a 3.7 x 25 cm. column of Magnesol packed from dry ethyl acetate. All three compounds, hesperidin, hesperetin, and the hesperetin-7-glucoside were present on this column, but a relatively clean separation was possible. The central portion of the middle zone was collected as a separate fraction and taken to dryness under reduced pressure. The resulting solid-yield about 0.35 g. was purified by four recrystallizations from alcohol.

*Example III*

Five g. of naringin, 100 ml. of cyclohexanol and 50 ml. of formic acid were refluxed for approximately 20 hours. Samples were withdrawn at regular intervals and chromatographed as in Example I. $R_f$ values in 15% acetic acid were 0.80 for naringin; 0.75 for naringenin-7-glucoside; and 0.47 for naringenin. The first detectable trace of naringenin-7-glucoside was found after three hours, and continued to increase relatively for about 15–20 hours. At the conclusion of the refluxing the solution was concentrated by distilling off the solvent until the temperature reached 135° C. After concentration, the volume of the remaining hydrolyzed solution was doubled with acetone and filtered through a 1.5 x 3 cm. column of "Magnesol." Filtration removed a dark, flocculant material. The solution was then chromatographed on a 7 x 25 cm. column of "Magnesol" packed as an acetone slurry. When all of the reaction mixture had been adsorbed, a column volume of dry ethyl acetate was passed through to displace the cyclohexanol and wet ethyl acetate was then used for elution. The column was too overloaded to permit detection of zones, but some fractionation was possible. The eluate was collected in fractions and microliter portions were spotted on paper. The first fractions contained mainly naringenin and were discarded. Elution was continued, and fractions containing naringenin-7-glucoside now appeared, and were collected, combined and concentrated to 200 ml. in vacuo, and rechromatographed on a 4.5 x 20 cm. column of "Magnesol," packed this time as an ethyl acetate slurry. Some separation of the zones was detected under ultraviolet light, but a clear-cut separation was not achieved. The naringenin-7-glucoside fraction from this column was concentrated and again rechromatographed on a fresh 2.5 x 15 cm. column of "Magnesol." A good separation between the leading naringenin and the centrally located naringenin-7-glucoside was obtained in this case. A dark, narrow zone appeared at both the top and bottom of the central naringenin-7-glucoside zone. The dark zones were withdrawn separately and discarded, and the center of the middle zone was taken as the naringenin-7-glucoside. After evaporation at reduced pressure, the resulting glucoside solid-yield about 0.40 g. was recrystallized several times from a methanol-water solution.

In general, it may be said that the above examples are merely illustrative and should not be construed as limiting the scope of our invention, which should be understood to be limited only as indicated by the appended claims.

We claim:

1. A method of converting a rhamnoglucoside selected from the group consisting of flavonol rhamnolglucosides and flavanone rhamnoglucosides to a glucoside which comprises dissolving said rhamnoglucoside in a cycloaliphatic alcohol together with formic acid, refluxing the resulting solution until the resulting reaction is substantially complete, and recovering the resulting glucoside from the resulting reaction mixture.

2. The method of claim 1 wherein the cycloaliphatic alcohol is cyclohexanol.

3. The method of claim 1 wherein the rhamnoglucoside is rutin.

4. The method of claim 1 wherein the rhamnoglucoside is naringin.

5. The method of claim 1 wherein the rhamnoglucoside is hesperidin.

6. A method of converting a rhamnoglucoside selected from the group consisting of flavonol rhamnoglucosides and flavanone rhamnoglucosides to a glucoside which comprises dissolving said rhamnoglucoside in cyclohexanol, refluxing the resulting solution with approximately ¼ part to approximately ¾ part by volume of formic acid until the resulting reaction is substantially complete and recovering the resulting glucoside from the resulting reaction mixture.

References Cited in the file of this patent

UNITED STATES PATENTS 2,612,498    Alburn    Sept. 20, 1952
2,700,047    Wilson    Jan. 18, 1955